Nov. 29, 1932.  O. J. GROEHN  1,889,440
ORNAMENTAL GRILL FOR AUTOMOBILE RADIATORS
Filed Feb. 5, 1931
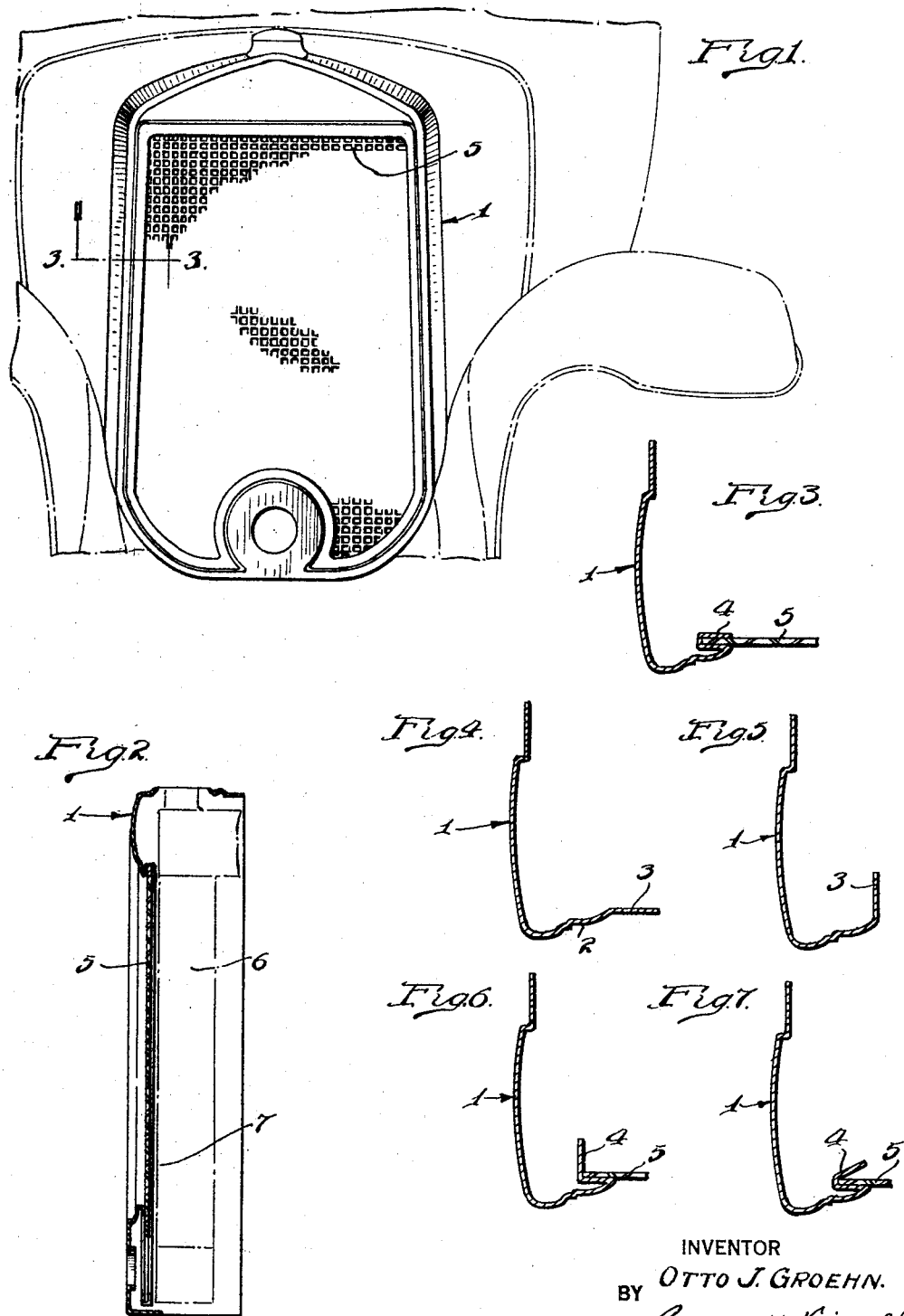
INVENTOR
*Otto J. Groehn.*
BY
*Barnes & Kissell*
ATTORNEYS Patented Nov. 29, 1932

1,889,440

UNITED STATES PATENT OFFICE

OTTO J. GROEHN, OF GROSSE POINTE PARK, MICHIGAN, ASSIGNOR TO CLAYTON AND LAMBERT MANUFACTURING COMPANY, OF DETROIT, MICHIGAN, A CORPORATION OF DELAWARE

ORNAMENTAL GRILL FOR AUTOMOBILE RADIATORS

Application filed February 5, 1931. Serial No. 513,468.

This invention relates to an ornamental grill for automobile radiators, and has to do particularly with an ornamental facing forming an integral part of the radiator shell.

Heretofore in fabricating and assembling ornamental grills or guards for radiator fronts, it has been the general practice to mount and support the grill on a separate frame which is positioned either forwardly or rearwardly of the normal front of the radiator shell. Such separate frame presents many problems of fabrication and assembly which has heretofore made the use of ornamental grills somewhat costly.

It is an object of the present invention to provide an ornamental grill having all the ornamental features of the frame supported grill and also serving as a guard plate for the radiator core or radiator shutters, but which ornamental grill is initially secured to the inner rim of the radiator shell so as to form an integral part thereof.

Another feature of the present invention resides in the extremely simple manner of assembling the ornamental grill as an integral part of the radiator shell; in this case the radiator shell not only serves as a direct support for the grill but this grill adds materially in reinforcing the radiator shell and protecting the radiator core.

Other features reside in the manner of fabricating the inner wall of the radiator shell and the manner of forming such wall to receive and secure the ornamental grill.

In the drawing:

Fig. 1 is a front elevation of the radiator shell embodying the present invention.

Fig. 2 is a vertical sectional view showing the combined shell and ornamental grill.

Fig. 3 is a sectional view taken on line 3—3 of Fig. 1, and illustrating the simple and compact manner of combining the ornamental grill with the radiator shell.

Fig. 4 is a sectional view similar to Fig. 3 but illustrating the first step in the fabrication of the shell preparatory to receiving the grill.

Fig. 5 illustrates the second step wherein the inner edge of the shell is bent inwardly.

Fig. 6 illustrates the next step in the method where the edge of the shell is so formed as to directly receive the grill.

Fig. 7 illustrates the preferred manner of clamping the grill in place.

The invention may be best understood by describing the method of fabrication. In stamping out and drawing a standard radiator shell such as at 1, I preferably so fabricate the front face or periphery 2 as to leave a laterally projecting flange 3 which in most cases will probably be longer than the flange left in forming the standard radiator shell.

Instead of merely cutting off or folding over this projecting portion to complete the front face of the radiator shell, I preferably turn the flange 3 in, as best shown in Fig. 5, and then so fabricate this flange as to form the right angular return flange 4, as best shown in Fig. 6.

An ornamental grill 5 which may be formed of any suitable material and in any suitable manner may then be inserted in place, as best shown in Fig. 6. The next operation is preferably to bend the flange 4 as shown in Fig. 7 and then flatten out the flange and clinch the grill, as best shown in Fig. 3.

The radiator shell 1 thus forms the sole supporting frame for the grill 5. The grill also in return materially reinforces the radiator shell and thus protects the radiator core 6 as well as guards the same against stones and other similar articles. The combining of the grill with the radiator shell requires substantially the same operations as are required in forming and finishing the interior flange of a standard radiator shell.

The finished flange which securely clinches and holds the grill in place may extend substantially around the entire grill or may be so fabricated at only certain parts of the periphery thereof. It will be understood that the complete flange as well as the radiator shell may take many different forms and that the steps in fabricating the flange and securing the grill thereto may also vary considerably in accordance with standard sheet metal practice. The periphery of the grill may be securely held in place by merely flattening the flange 4 thereagainst, or, if desired, the flange may be welded continuously or at localized portions.

It will be obvious that any desired shutter arrangement 7 may be positioned directly to the rear of the ornamental grill, and within the shell, as diagrammatically indicated in Fig. 2. In this case the grill in addition to strengthening the general radiator shell and acting as a guard for the radiator core will also serve to materially reduce the amount of foreign materials collecting in the various parts of the shutter arrangement.

What I claim is:

1. A radiator unit comprising a shell, a flange forming the front opening of said shell, and an ornamental grill directly and integrally secured to said flange by distorting said flange.

2. A radiator unit comprising a shell, a flange defining the front opening of said shell, and an ornamental grill directly secured to said shell and being clamped rigidly in place by said flange.

3. The combination with a radiator shell, of an ornamental grill closing the front opening thereof and secured to the shell by distortion of a part of the shell itself.

4. The combination with a radiator shell, of an ornamental grill closing the front of said shell, and a flange formed around the front of said shell and distorted to grip and secure the grill in position.

5. The combination with a radiator shell, of an ornamental grill closing the front of said shell, a flange formed around the front of said shell and distorted to grip and secure the grill in position, and shutters and a core positioned at the rear of said grill.

6. A radiator unit comprising a core, a shell surrounding said core and having walls extending forwardly thereof, said forwardly extending walls terminating in a flange, and an ornamental grill directly carried by and formed as a part of said flange by distorting said flange.

In testimony whereof I affix my signature.

OTTO J. GROEHN.